United States Patent [19]

Brady, Jr.

[11] Patent Number: 4,530,024
[45] Date of Patent: Jul. 16, 1985

[54] COMPUTER-CONTROLLED SYSTEM FOR PROTECTING ELECTRIC CIRCUITS

[75] Inventor: John A. Brady, Jr., Rockville, Md.

[73] Assignee: The United States of America as represented by the Secretary of the Navy, Washington, D.C.

[21] Appl. No.: 520,273

[22] Filed: Jul. 21, 1983

Related U.S. Application Data

[63] Continuation-in-part of Ser. No. 276,593, Jun. 23, 1981, abandoned.

[51] Int. Cl.³ .............................................. H02H 7/26
[52] U.S. Cl. ........................................ 361/63; 361/93
[58] Field of Search ...................... 361/93, 62, 63, 94, 361/96; 364/481, 483, 492; 114/312

[56] References Cited

U.S. PATENT DOCUMENTS

| | | | |
|---|---|---|---|
| 3,873,887 | 3/1975 | Barkan et al. | 361/63 X |
| 4,321,645 | 3/1982 | Thom et al. | 361/63 |
| 4,331,999 | 5/1982 | Engel et al. | 361/94 |
| 4,346,422 | 8/1982 | Inzoli | 361/62 |

FOREIGN PATENT DOCUMENTS 454234  1/1928  Fed. Rep. of Germany ........ 361/62

OTHER PUBLICATIONS

"Development of Deep-Ocean Work System", Mechanism & Machine Theory, 1977, vol. 12, No. 5, pp. 569–576, Pergamon Press, Estabrook et al.

Primary Examiner—Reinhard J. Eisenzopf

[57] ABSTRACT

A computer-controlled system protects electric circuits where power and branch load circuits are all disposed outside the pressure hull of a submersible in a marine environment. The system generally comprises a combined inboard operator panel and computer arrangement and an inboard or outboard circuit breaker computer operatively connected by a data link to the panel computer. A multiplexer/demultiplexer arrangement is provided for the system to minimize the passage of electric lines through the hull. The circuit breaker computer compares its stored information with the output of circuit current sensors to detect whether a circuit fault condition exists and if so to open the interrupter of the fault-detected circuit. Moreover, if a circuit fault is detected greater than a predetermined value, e.g., greater than 500% normal load current value, the circuit breaker computer not only opens the fault detected branch circuit but also the power circuit. The circuit breaker computer is programmed that even if the data link is disconnected with the operator computer, the circuit breaker computer continues to monitor all circuits thereby enabling continued operation of the submersible without endangering the crew.

12 Claims, 6 Drawing Figures

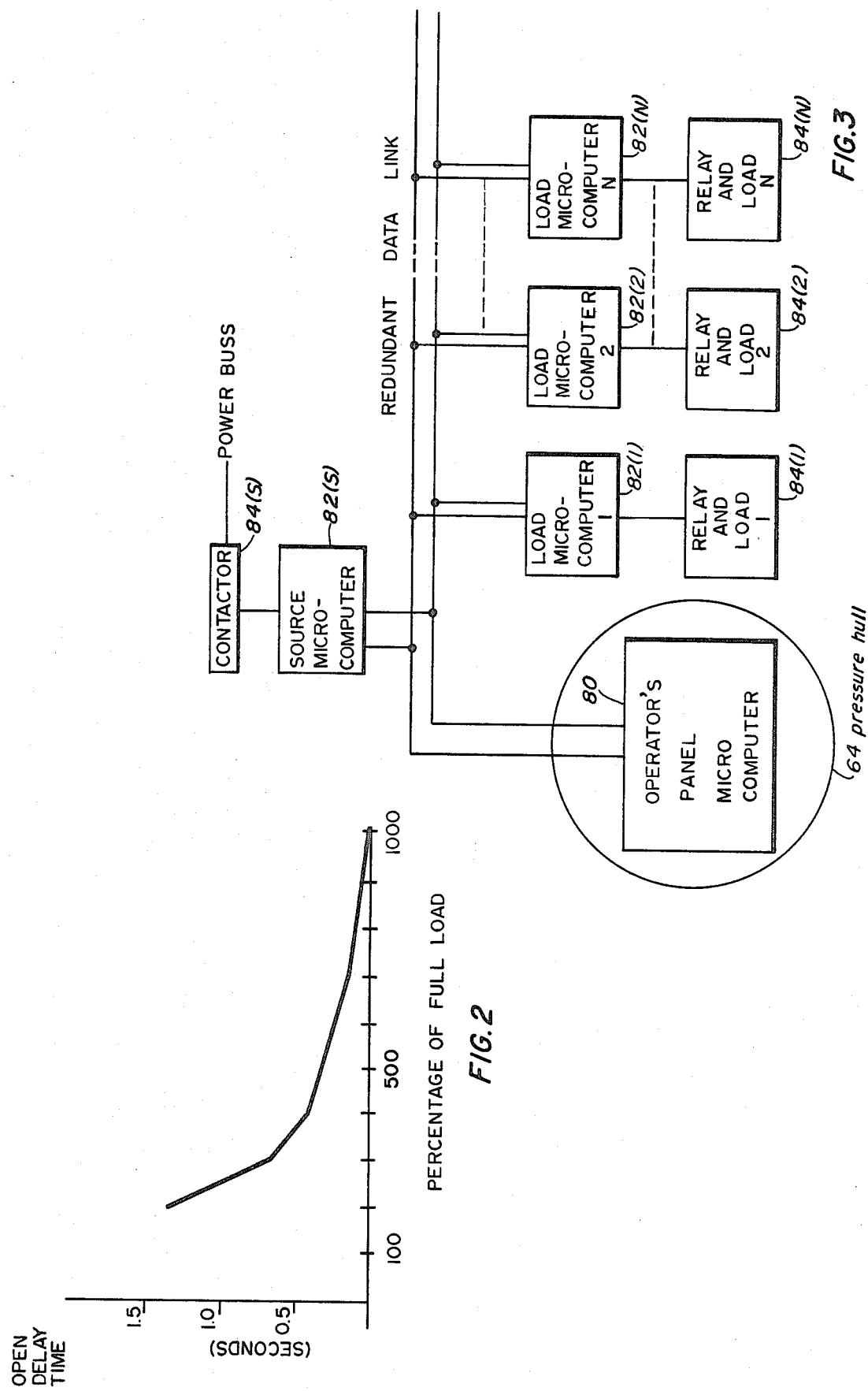

4,530,024

COMPUTER-CONTROLLED SYSTEM FOR PROTECTING ELECTRIC CIRCUITS

This is a continuation-in-part of patent application with Ser. No. 276,593 filed June 23, 1981, now abandoned.

BACKGROUND OF THE INVENTION

This invention relates generally to circuit protective systems and especially to a computer-controlled system for protecting one or more electric circuits.

Existing deep-submergence vehicles (DSV's) employ non-computer-controlled circuit breaker systems. Each breaker of a system comprises two current sensors and a current interrupter of the heavy-duty-contactor type so as to protect the outboard circuits which may include various lights, propeller motors, and hydraulic pump motors. These circuits are supplied through two 30-volt DC and two 60-volt DC systems. A non-computer-controlled system may usually include 15 contactors and 35 current sensors.

A sensor and/or a contactor is installed in an oil-filled box, which is disposed outboard of the pressure hull of the DSV, and which may be exposed to 9000 psi pressure or more and temperatures as low as 32° F. Operation of the system in this formidable and marine-exposed environment requires yearly inspection and tri-yearly recalibration of the current sensors, where each inspection and recalibration can be quite expensive and time-consuming. Additionally, the reaction time of the existing circuit breakers, installed in compensated oil-filled boxes, (Dow-Corning-200-1) significantly increases with depth as the viscosity of the fluid materially increases. Hence, by virtue of the calibrated sensors and oil-filled circuit breakers, these prior circuit breaker systems for a DSV are extremely susceptible to malfunction.

SUMMARY OF THE INVENTION

Accordingly, an object of this invention is to provide an improved system for protecting one or more electric circuits that saves time and money by eliminating inspections and recalibrations of current sensors.

Another object is to provide an automatic, programmed, computer-controlled system for protecting one or more electric circuits exposed to a submerged marine environment that will be impervious to the submerged marine environment and less susceptible to malfunction.

These and other objects are achieved by a computer-controlled protection system for one or more branch load circuits, which take power from a common power source. Both the source and each load circuit being protected by the system are provided with a circuit breaker that is comprised of a current interrupter or a relay and a pair of current sensors. The current sensors provide current-value information to one or more circuit breaker computers. These computers are programmed to compare the current value for each circuit with its particular fault-condition curve and to decide whether a fault condition exists; and, if so, open the branch circuit. Further, if a massive fault occurs, then the system branch circuit or circuit breaker computer will also open the supply source circuit. During use of the system, the supply circuit is reclosed after a predetermined period of time elapses, but the branch circuit with a detected fault will remain open until it can be checked and cleared for reclosing. One of the advantages of the system is that it has eliminated calibration requirements and significantly reduced the use of mechanical parts.

BRIEF DESCRIPTION OF THE DRAWINGS

FIG. 2 is a curve showing the time delay for opening a typical relay after application of various overload values of current to the relay coil.

FIG. 3 is a block diagram of another embodiment of the invention which employs a plurality of load computers and a corresponding plurality of loads.

DETAILED DESCRIPTION OF THE INVENTION

Figure 1:
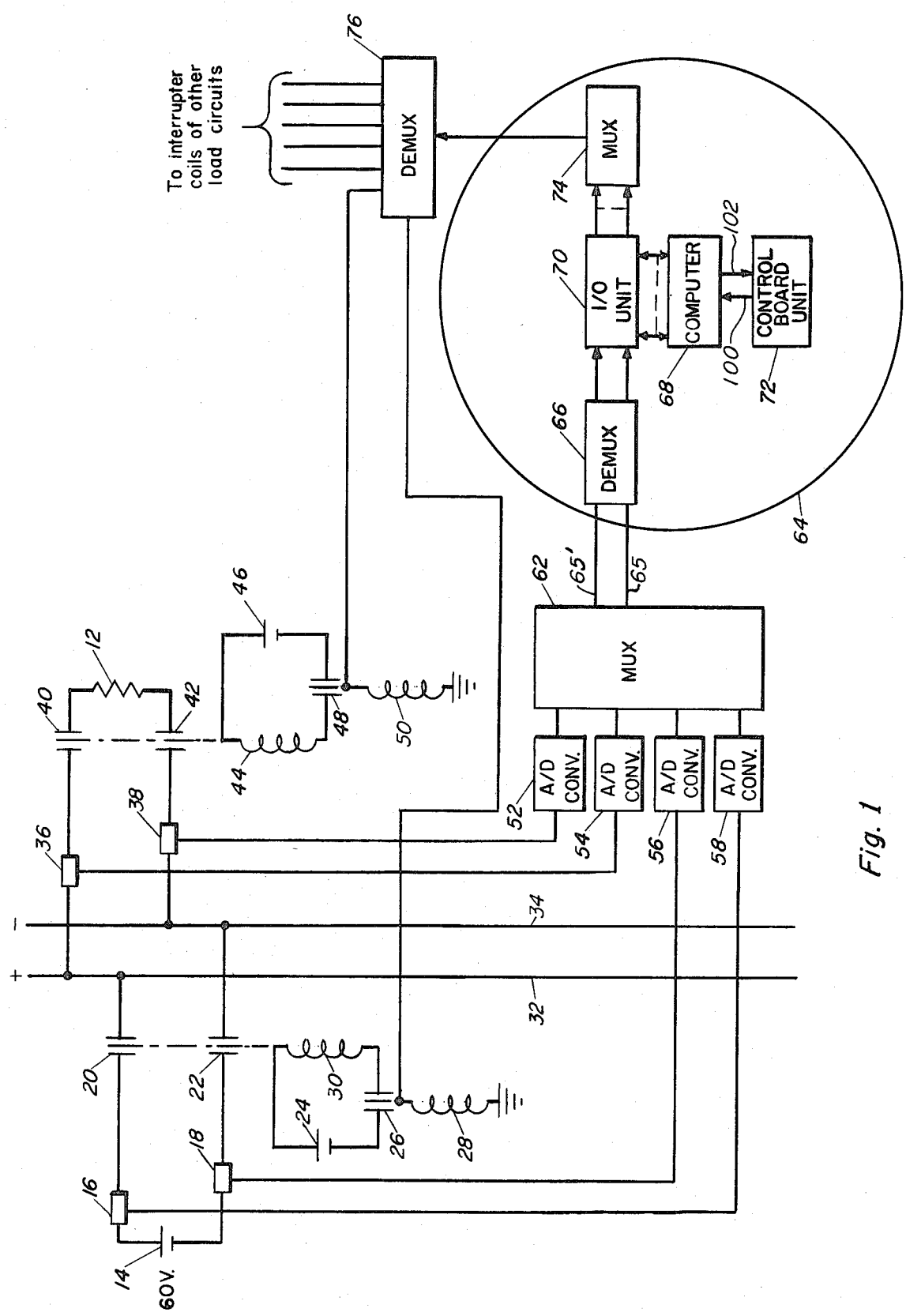
FIG. 1 is a schematic diagram of an embodiment of the invention.

The present invention will be described herein with specific reference to its applicaion to the outboard circuits of a DSV. However, it should be noted that the invention has a more general application to the protection of a source circuit and one or more branch load circuits. Each circuit is connected to a common power source circuit and is also protected by a circuit breaker. A circuit breaker is also provided for the source circuit.

The circuit breaker for each circuit consists of an interrupter of the contactor or relay type and a current sensor in each leg of the circuit. As will become more apparent hereinafter, the current sensors of each circuit are electrically connected to a circuit breaker computer which compares its data base or stored information with the signal output of a current sensor. If the signal output of a sensor is higher than a predetermined value stored in the computer, the computer will provide an output that is transmitted to an interrupter of the circuit where the fault has been detected by the sensor so as to open the circuit. Hereinafter, unless otherwise specified, the term "contactor" will be used for circuit interrupters used to open the main power circuit and "relay" for interrupters that open branch load circuits.

Power on a DSV is delivered to different loads (i.e., branch load circuits comprising outboard lights, motors, etc.). The present invention incorporates programmed computers, preferably microcomputers, to control the closure and opening of contactors and load relays external to the pressure hull. The microcomputers are programmed to monitor the current drawn by each load including the supply current and to interrupt the current should any current exceed its limit or fault condition for example, in magnitude and/or time duration.

The protective system governs the distribution of power outside the pressure hull of the DSV. Operator control of motors, lights and other loads is established through a system of battery-operated contactors and load relays. These contactors and relays can be tripped open or closed in response to operator commands received over a data communication bus from the operator computer. A circuit breaker computer also protects the vehicle by detecting system faults and responding automatically to these faults. A fault, or overload, is a condition that may cause a load to draw an abnormally large current (e.g., 500% greater than normal or full load current) for an extended period of time (e.g., 0.4 seconds) (see FIG. 2). The system, therefore, measures the magnitude of current delivered to each load as well as the amount of time the current exceeds a predetermined limit. The ability to monitor the length of time that an overload persists enables the system to distinguish transient phenomena (power up) from actual faults. A fault can be defined as a point on a time-current curve (see FIG. 2, for example) that plots the duration of an overload current versus its magnitude. When the system has determined that a fault exists, it responds by opening the appropriate interrupter to cut off current to the faulted load.

The protective system is designed to incorporate relatively small relays to deliver power through contacts to a load. The advantage of using small relays is that they provide considerable savings in size and weight with respect to conventional contactors (e.g., the BD-241). The disadvantage is that smaller relays are incapable of interrupting the current associated with extreme fault conditions (e.g., greater than 500% of normal load current). What is done, therefore, is to use a large contactor as the supply source (battery) breaker to deliver current to smaller load relays. The system discriminates between nominal fault conditions (overloads) and extreme, or massive, fault conditions (short circuits). The small relays are adequately rated to interrupt nominal faults and the larger contactors are adequately rated to interrupt massive faults.

Upon detection of a short circuit, the system responds by tripping open the battery-operated larger source contactor that delivers current to the shorted load. Power is momentarily (milliseconds) interrupted to all loads serviced by that contactor while the system trips open the smaller relay in the branch circuit where the fault occurred. Once the faulted load is removed from the power bus, the system recloses the source circuit breaker and thus restores current to all non-faulted loads.

FIG. 1 shows an embodiment of the protector system in abbreviated form, that is, only one load circuit is shown. It is to be understood that there is a plurality of load circuits, each of which has the same protective devices and arrangement as load 12, which may be a light, motor, pump, etc. The load circuit including other load circuits (not shown) are parallel connected by way of supply buses 32 and 34 to a source circuit with a 60 V battery source 14 and positive and negative legs.

In the DSV, there are two 60 V sources and two 30 V sources, each supplying separate loads and each having its own protective system of sensors and interrupters. As will be explained more fully hereinafter, the set of units of the system that are located inside a pressure hull 64 of a DSV could be designed to service all outside load circuits, or separate sets of units (not shown) could be employed for each supply source and its group of loads.

Shunts (current sensors) 16 and 18, which provide an output voltage proportional to the current flowing through them, are placed in the positive and negative legs of the power or source circuit. The contacts are opened when coil 30 of the contactor is energized. The coil 30 is energized by a small power source 24, such as a small battery, through the closing of the contacts 26 of an energizing circuit relay, the coil 28 of which is under the control of a circuit breaker computer 68. A shunt is a calibrated resistor connected in series with a circuit. A voltage proportional to the current is picked off by the shunt and used as a measure of current flow therein. Shunts are insensitive to pressure and temperature and therefore more useful in an underseas environment than the present electro-mechanical current sensors used in DSV's. These resistor-shunt devices are installed in pressure-compensated enclosures filled with insulating fluid and exposed to a pressure that is equivalent to 20,000 feet of sea pressure. The shunts are maintenance-free while the aforementioned Hartman devices are not.

Each load circuit has shunts (current sensors) 36 and 38, one in each leg. Contacts 40 and 42 of a load relay are operated by the coil 44 of the relay and are opened upon energization of the coil 44 by the flow of current from an energizing circuit power source 46, such as a small battery. Current flow occurs when contacts 48 of a small energizing circuit relay are closed by operation of coil 50 which is controlled by computer 68.

The output voltage of each current sensor, e.g., sensor 16, is fed to an analog-to-digital (A/D) converter 58, which provides a digital signal that is indicative of the magnitude of the analog input signal. The input signals to all A/D converters 52, 54, 56 and 58 stem from the output of sensors in the positive and negative legs of a circuit. The output signals of the converters are fed to a multiplexer 62.

Once inside pressure hull 64, a multiplexer line or data link 65 is fed to a demultiplexer 66, the output lines of which are fed to an input/output unit 70 and then to a circuit breaker computer 68 for the source and load circuits. A second multiplier link 65' functions as a redundant data link that is similar to the redundant data link as specified in the species of FIGS. 3 and 4. There is an output line from the demultiplexer for each sensor signal. Computer 68 compares each sensor signal with its stored information that will indicate a fault condition for the circuit whose current is being sensed if an out-of-specification condition occurs. The outputs of computer 68 are fed through input/output unit 70 to a multiplexer 74 to place the output signals on a signal line for passage through pressure hull 64. The multiplexers are used to reduce the number of lines entering by way of fittings (not shown) into the pressure hull of the DSV. This reduction in fittings by use of multiplexers 62 and 74 not only reduces the reinforcing requirements of the pressure hull of a DSV but also minimizes sealing requirements therefor.

Once outside the hull, the multiplexer output is fed to a demultiplexer 76, the outputs of which are coupled to the proper energizing circuit coils by the circuit breaker computer memory which directs a closing signal to the energizing coil of the faulted circuit. Thus, e.g., if the computer input signal came from sensor 36 or 38, demultiplexer 76 would be directed to couple the computer output signal to relay 50 (the demultiplexer would have an output signal a if comparison of the input sensor signal to the circuit breaker computer with the fault condition information stored therein indicates that a fault exists). Contacts 48 would then be closed to energize load-relay coil 44 to open contacts 40 and 42, thereby cutting off current to load 12.

A combined operator panel and microcomputer arrangement 72 controls the open/close position of interrupter contacts 40, 42, and 20, 22; e.g., by arrangement 72 commanding the energizing of coils 50 and 28, respectively, to close their respective contacts 48 and 26 so as to open contacts 40, 42, 20 and 22. The operation of panel 72 in relation to computer 68 will be more fully set forth in FIGS. 5A and 5B as set forth below.

As has been previously stated, if a massive fault condition exists, the supply source contactor is opened (contacts 20 and 22) in FIG. 1) temporarily and is reclosed after a predetermined period of time. This period of time depends on factors which may be specific for a particular environment in which the protective system is operative. For existing DSV's, 70 milliseconds is a typical time period.

Figure 4:
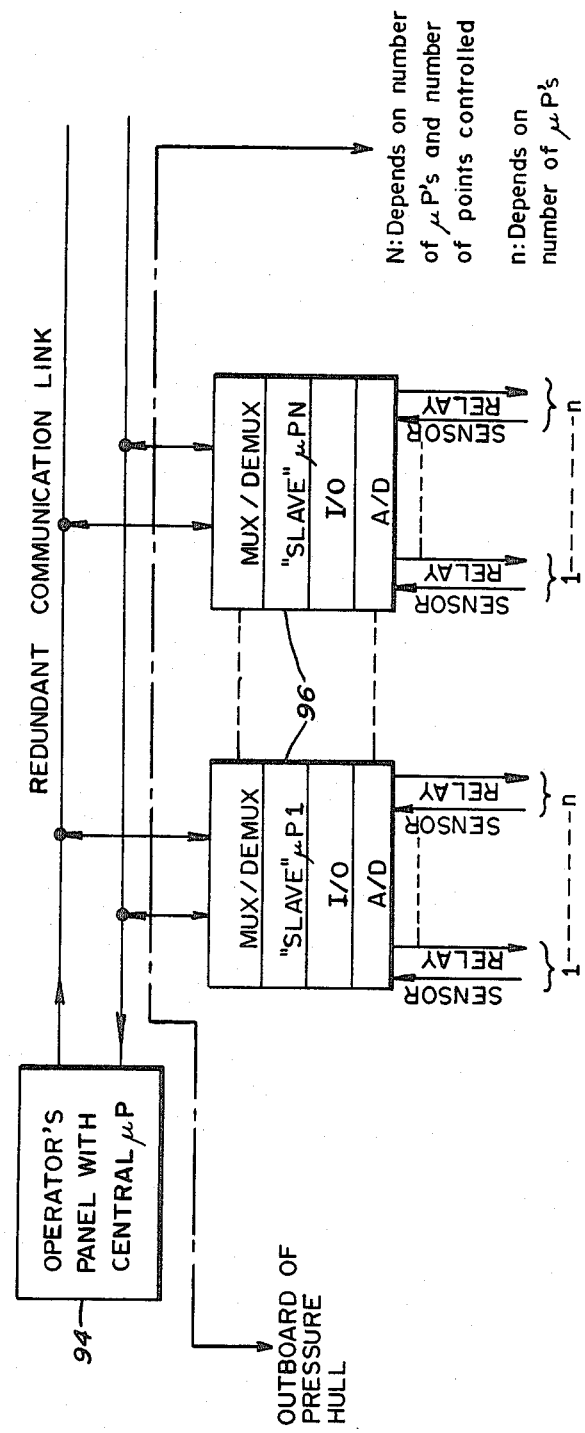
FIG. 4 is a block diagram of another embodiment of the invention which employs a central computer and a series of slave computers, the number of slave computers being determined by the number of circuits requiring protection.

As shown in FIG. 3 and depending upon the design or mission requirements of a DSV, an operator's panel with its computer 80 is disposed inside pressure hull 64 while a series of load circuit breaker computers 82(1)-82(N) along with a source circuit breaker computer 82(S) are all disposed outside the hull. Each load computer is associated with a different load and a relay 84(1)-84(N); and the source computer with a contactor 84(S) and a power bus. In this case, each load or source computer would store the fault condition data for its associated load, make the comparison, and open the load circuit if necessary. Circuit status information would be transmitted to the operator's panel with computer 80. The operator, through his computer, would be able to close the source contactor and load relays at the start of an operation and open them at the finish of an operation. To make the system more reliable, a second, or redundant, data link is used. The operator's computer and each other computer communicate with each other to indicate circuit status and possible errors in transmitted information. The invention may also be implemented using a central operator computer/slave circuit breaker computer arrangement as shown in FIG. 4. Each slave computer 96 monitors several loads and also communicates with the central computer 94. Essentially this arrangement is the same as FIG. 3 with the slave computer replacing load computers 1, 2, . . . N.

Figure 5A:
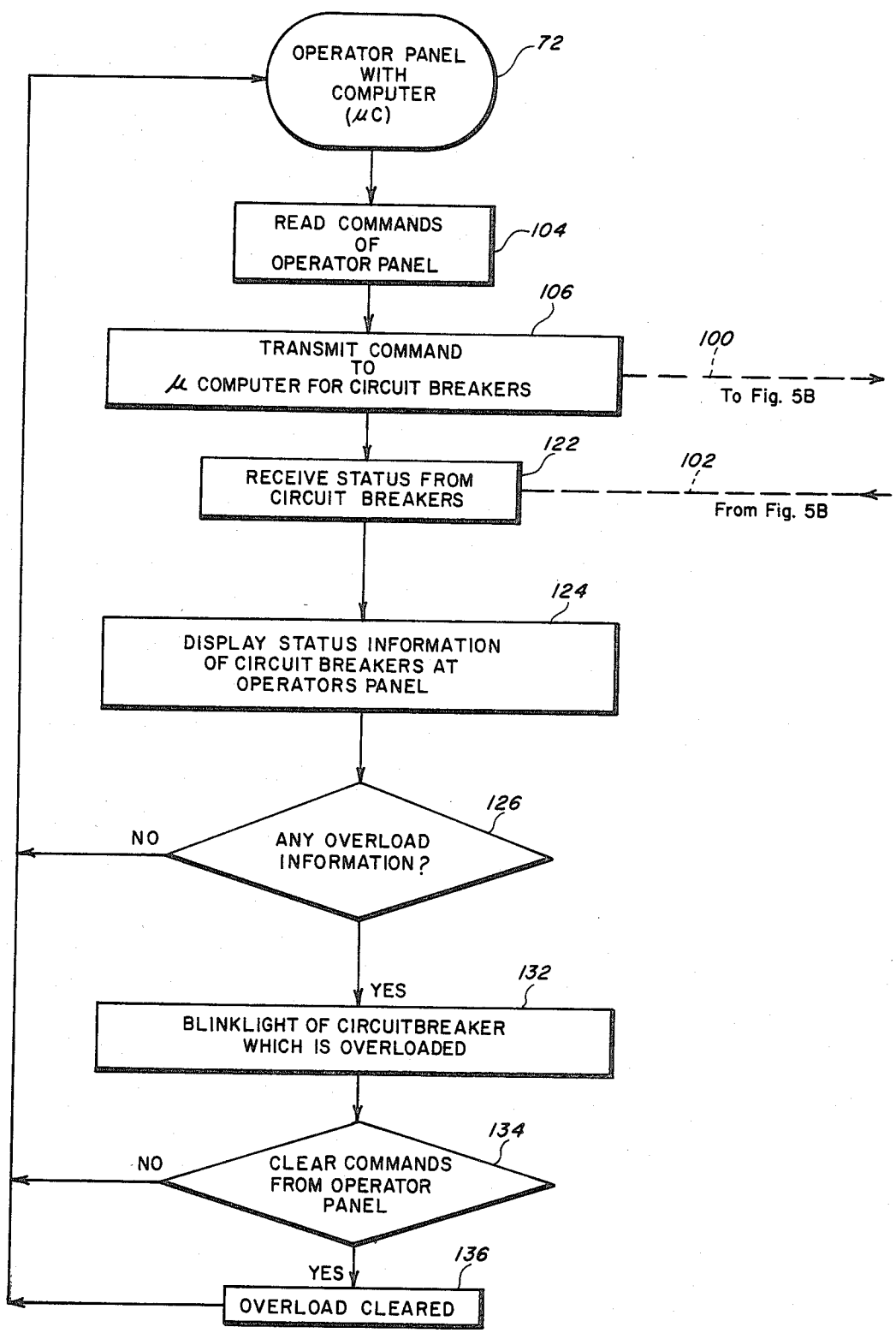
FIGS. 5A and 5B diagrammatically illustrate, when taken together, the flow charts for both the combined operator panel and computer arrangement along with the load/source circuit breaker computer of FIG. 1.
Figure 5B:
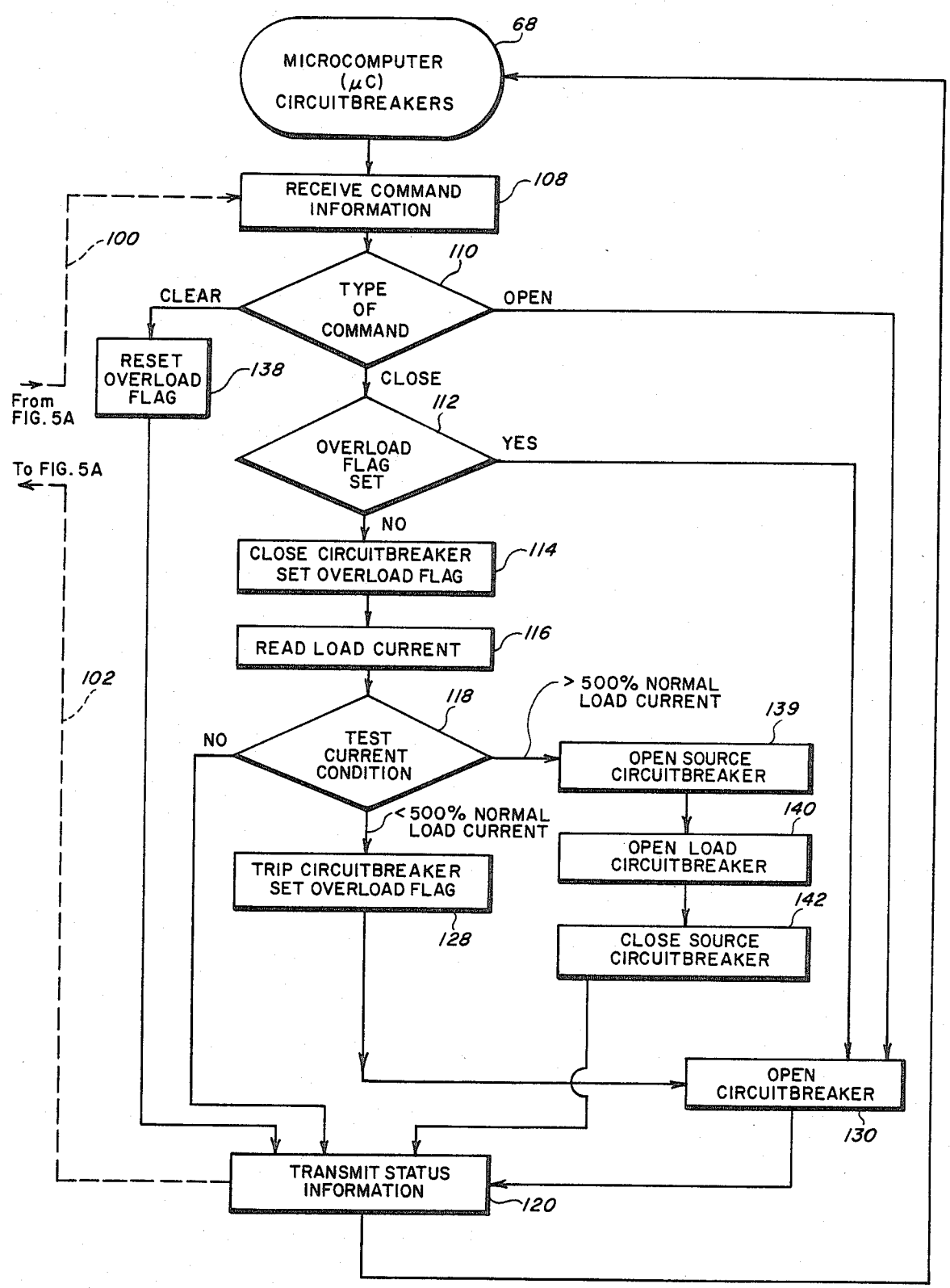

As indicated in FIGS. 5A and 5B, an operator panel with microcomputer 72 and a circuit breaker microcomputer 68 for the source/load circuits of FIG. 1 are each provided with separate flow charts that are interlinked by dotted data links 100 and 102. Operator panel 72 includes appropriate manually operated switches or controls for selectively opening and closing contacts 20, 22, and 40, 42 of the source and load circuits in FIG. 1. The panel also includes lights for each circuit that blink when a circuit breaker for any circuit is open.

Assume the operator or pilot of a DSV intends to close a circuit breaker of a circuit of the system of FIG. 1. When the operator closes the switch of panel 72 for closing the circuit breaker, a command signal from the switch will be sent from panel 72 to a block 104 as indicated in FIG. 5A. The command signal output of block 104 is transmitted to a block 106 for transmission to a block 108 via a data link 100. At a block 110 as depicted in FIG. 5B the command signal will be processed and a closed circuit breaker signal will be transmitted to a block 112. If an overload flag is not set at block 112, a signal will be sent to a block 114 for closing the circuit breaker to close a circuit and setting the overload flag.

A block 116 continuously reads load currents of the closed circuit. If not current overload of the circuit is detected by a decision block 118, a "no" signal from block 118 will be transmitted to a status transmission block 120 for transmittal to a circuit breaker status block 122 of FIG. 5A via data link 102. The output of block 122 will be transmitted to a block 124 for display of circuit breaker status on operator panel 72.

If an overload current or a fault condition for a circuit is detected by block 118 where the fault is less than 500% of normal or full load current, a block 128 of FIG. 5A will trip the circuit breaker of the circuit and set the overload flag. At a block 130, the circuit breaker will be opened. Status of the opened circuit breaker will be transmitted by block 120 to blocks 122, 124 and 126 via data link 102. Because of the detected overload, a block 132 of FIG 5A will receive an output from block 126 to blink a light on operator panel 72 to indicate which circuit breaker is opened. When the cause of the fault is corrected, this information will be reported by the "no" output of block 118 to block 126 via data link 102. Because of the "no" output of block 126, the blinking light will be extinguished as indicated on panel 72. The operator will then issue a clear command from panel 72 to a decision block 134, the "yes" output of which is transmitted by a block 136 to panel 72 for transmission to blocks 104 and 106, and then to blocks 108 and 110 via data link 102. Because of the clear command signal from panel 72, block 110 will transmit an output to a block 138 for resetting or clearing the overload flag. The output of block 138 is transmitted back to panel 72 by way of block 120, data link 102, and blocks 122, 124 and 126. At this time the operator through a command switch from panel 72 may reclose the circuit breaker.

If block 118 during operation of the computer-controlled system detects a major fault, e.g., a short circuit in a circuit that is greater than 500% of normal load current, block 118 will transmit an output to a block 139, as illustrated in FIG. 5B, for immediately opening the source circuit breaker to prevent any damage to the branch circuit relays of the system and the circuits themselves. A block 140 upon receiving the output from block 139 will open the load circuit breaker where the short circuit occurred. A block 142 after a predetermined period of time and after it receives the output of block 140 will reclose the source circuit breaker thereby reestablishing power to the branch circuits where no short circuit has been detected by block 118. Closing of the source circuit breaker is transmitted to panel 72 from block 142, block 120, data link 102, and to blocks 122, 124 and 126.

One of the advantages of separate computers for panel 72 and the circuit breakers of the improved system is that if a data link 100 or 102 is disconnected during DSV use, microcomputer 68 with its program of FIG. 5B will continue to monitor the circuits so as to maintain operation of the DSV without endangering its crew.

Although the flow chart of FIGS. 5A and 5B was discussed in reference to the species of FIG. 1 it is evident that microcomputer 68 could be either the source computer or any load computers of the species of FIG. 3, or even any slave microcomputer of the species of FIG. 4.

The protective system of the invention is very flexible in that the computer can be programmed to perform other valuable functions. For example, the computer can be made to subtract the currents in the sensors located in the + and − legs of each branch so that leakage currents can be detected. A record of leakage currents can be stored so that the developments of fault conditions can be monitored. This will allow detection of incipient faults and opening of interrupters/relays before an actual fault condition occurs. Detection in this manner will permit trouble shooting before rather than after, a fault occurs.

The computer-controlled protection system also lends itself to application in alternating-current power networks. Frequency, current, voltage, power and power factor are easily monitored, given the proper interface.

Obviously, many modifications and variations of the present invention are possible in light of the above teachings. It is therefore to be understood that, within the scope of the appended claims, the invention may be practiced otherwise than as specifically described.

What is claimed is:

1. A marine-exposed and computer-controlled D.C. electric circuit protection system for protecting same from electric overloads on a submersible vehicle, the vehicle including a pressure hull, said system being made up of a battery-powered power circuit and at least one branch load circuit, means for electrically interconnecting the power and branch circuits, the power and branch load circuits having legs which are located outside the pressure hull of said vehicle, said system comprising:

a plurality of current sensors, one sensor in each leg of the power and branch load circuits, each sensor being arranged to give an output corresponding to the magnitude of current flow through it;

a plurality of current interrupters, each interrupter having a coil and a series of two sets of contacts, the coil for opening the sets of contacts of the series when the coil is energized, one interrupter of the plurality of current interrupters being associated with the power circuit and having one set of contacts connected in a positive leg of the power circuit and the other set in a negative leg, the other interrupter of the plurality of current interrupters being associated with the load circuit and having one set of contacts connected in a positive leg of the load circuit and the other set in a negative leg;

each one of the plurality of current sensors and each one of the plurality of current interrupters all being located outside the hull of said vehicle, a combined operator panel and computer arrangement, and a circuit breaker computer, the circuit breaker computer being connected to the branch and power circuit sensors, data link means for interconnecting the combined operator panel and computer arrangement and the circuit breaker computer, and energizing means connected between said circuit breaker computer and the coil of each interrupter of said plurality of interrupters, said energizing means for energizing the coil of at least one interrupter when an electric overload fault condition is detected in a circuit, the circuit breaker computer being programmed to compare its stored information with the signals received from the sensors connected thereto so as to produce a fault output signal when the comparison indicates that an electric overload fault condition has been detected by a sensor in a circuit, the circuit breaker computer being arranged to send the fault output signal to the energizing means to open the sets of contacts of the current interrupter associated with the fault-detected circuit, and also being arranged to communicate by the data link means with the combined operator panel and computer arrangement so as to indicate the status of any circuit, the combined operator panel and computer arrangement being programmed to perform operations for selectively closing the set of contacts of one or more current interrupters of the plurality thereof in response to one or more commands by an operator, the circuit breaker computer causing the opening of the sets of contacts of the current interrupter of a fault-detected circuit even when commands of the combined operator panel and computer arrangement are transmitted by the data link means to close the contacts of the current interrupter of the fault-detected circuit, and the circuit breaker computer also continuing to detect one or more fault conditions in a branch or power circuit even when the data link means is disconnected between the combined operator panel and computer arrangement and the circuit breaker computer.

2. A system as in claim 1 wherein said circuit breaker computer is disposed outside the hull of said vehicle.

3. A system as in claim 1 wherein said circuit breaker computer is comprised of more than one circuit breaker computer, one circuit breaker computer being connected to a power circuit, another circuit breaker computer being connected to a branch circuit, wherein all of the circuit breaker computers are disposed outside the hull of said vehicle and wherein said data link means interconnects the combined operator panel and computer arrangement to all of said circuit breaker computers.

4. A system as in claim 1 wherein said data link means includes redundant data link means.

5. A system as in claim 1, wherein:
said circuit breaker computer is programmed to keep said power circuit current interrupter open for a predetermined period of time when a fault is detected in a load circuit that is greater than 500% of normal load current value.

6. A system as in claim 1, wherein:
said circuit breaker computer is programmed to maintain the branch load circuit interrupter in an open condition until the fault condition in the branch circuit has been removed.

7. A system as in claim 1 wherein each sensor can be exposed to about 20,000 feet of sea pressure; and wherein each sensor is installed in a pressure compensated enclosure which is located outside of the hull of said vehicle and which is filled with an insulating fluid.

8. A marine exposed and computer-controlled D.C. electric circuit protection system for protecting same from electric overloads on a deep submergence vehicle (DSV), the DSV having a pressure hull, said system being made up of a battery-powered power circuit and a plurality of branch load circuits; means for electrically interconnecting the power circuit and the branch load circuits, the power circuit and each branch circuit having legs, said legs being located outside the pressure hull of said DSV, said system comprising:

a plurality of current sensors located outside the hull of said DSV, one sensor in each leg of the power and branch load circuits, each sensor being arranged to produce an output corresponding to the magnitude of current flow through it, and also being installed in a pressure compensated enclosure, the enclosure being filled with an insulating fluid;

a plurality of current interrupters located outside the hull of the DSV, each interrupter having a coil and a series of two sets of contacts, the coil for opening said sets of contacts when the coil is energized, one interrupter being associated with the power circuit and having one set of contacts connected in a positive leg of the power circuit and the other set in a negative leg, each other interrupter being associated with its respective branch load circuit and having one set of contacts connected in a positive leg of its load circuit and the other set in a negative leg;

a plurality of A/D converters located outside said pressure hull, each converter being connected to the output of its associated sensor of said plurality of sensors;

a first multiplexer, the multiplexer being located outside the hull of said DSV and also being connected to the output of each A/D converter of the plurality of converters;

a first demultiplexer located within said pressure hull and connected to the output of said first multiplexer;

computer means; said computer means being comprised of a combined operator panel and computer arrangement, and a circuit breaker computer, the combined operator panel and computer arrangement being disposed within the hull of the DSV, the circuit breaker computer being connected to the output of the first demultiplexer, data link means for interconnecting the combined operator panel and computer arrangement to the circuit breaker computer, a second multiplexer located within said pressure hull and being connected to the output of said circuit breaker computer for multiplexing the output of said circuit breaker computer;

a second demultiplexer located outside pressure hull and being connected to the output of said second multiplexer for demultiplexing the output of said second multiplexer and energizing means connected between the output of said second demultiplexer and the coil of each interrupter of said plurality of interrupters, said energizing means for energizing the coil of at least one interrupter when an electric overload fault condition is detected in a circuit, the circuit breaker computer being programmed to compare its stored information with the signals received from the first demultiplexer connected thereto so as to produce a fault output signal when the comparison indicates that an electric overload fault condition has been detected by a sensor in a circuit, the circuit breaker computer being arranged to send the fault output signal to the energizing means to open the sets of contacts of the current interrupter associated with the fault-detected circuit, and also being arranged to communicate by the data link means with the combined operator panel and computer arrangement so as to indicate the status of any circuit, the combined operator panel and computer arrangement being programmed to perform operations for selectively closing the sets of contacts of one or more current interrupters of the plurality thereof in response to one or more commands by an operator, the circuit breaker computer causing the opening of the sets of contacts of the current interrupter of a fault-detected circuit even when commands of the combined operator panel and computer arrangement are transmitted by the data link means to close the contacts of the current interrupter of the fault-detected circuit, and the circuit breaker computer also continuing to detect one or more fault conditions in a branch or power circuit even when the data link means is disconnected between the combined operator panel and computer arrangement and the circuit breaker computer.

9. A system as in claim 8 wherein said circuit breaker computer is disposed inside the hull of said vehicle.

10. A system as in claim 8 wherein said data link means includes redundant data link means.

11. A system as in claim 8, wherein:
said circuit breaker computer is programmed to keep said power circuit current interrupter open for a predetermined period of time when a fault is detected in a load circuit that is greater than 500% of normal load current value.

12. A system as in claim 8, wherein:
said computer means is programmed to maintain any branch load circuit interrupter in an open condition, until the fault condition in the branch circuit has been removed.

* * * * *